United States Patent [19]

Phillips

[11] 4,092,909

[45] June 6, 1978

[54] PERFORATED SELF-DRAINING MEATLOAF BAKING PAN

[76] Inventor: John M. Phillips, 2389A Carlton Pl., Costa Mesa, Calif. 92627

[21] Appl. No.: 704,734

[22] Filed: Jul. 12, 1976

[51] Int. Cl.² ............................................. A47J 37/12
[52] U.S. Cl. ........................................ 99/444; 99/410
[58] Field of Search ................. 99/444, 445, 446, 425, 99/410–411; 220/1 C, 85 H, DIG. 6, DIG. 27, 22; 126/39 M

[56] References Cited

U.S. PATENT DOCUMENTS

| | | | |
|---|---|---|---|
| 1,819,660 | 8/1931 | Stone | 99/446 |
| 2,588,614 | 3/1952 | Capra et al. | 99/410 |
| 3,124,266 | 3/1964 | Morgan | 220/4 B |
| 3,927,610 | 12/1975 | Minsky et al. | 99/425 |

Primary Examiner—Leonard D. Christian

[57] ABSTRACT

A self-draining baking pan comprising a receptacle, including a bottom wall and a peripheral wall and two leg stands pivotally attached to the peripheral wall for supporting the bottom of the receptacle above a supporting surface. Drain holes are provided in the peripheral wall and the bottom wall.

4 Claims, 3 Drawing Figures

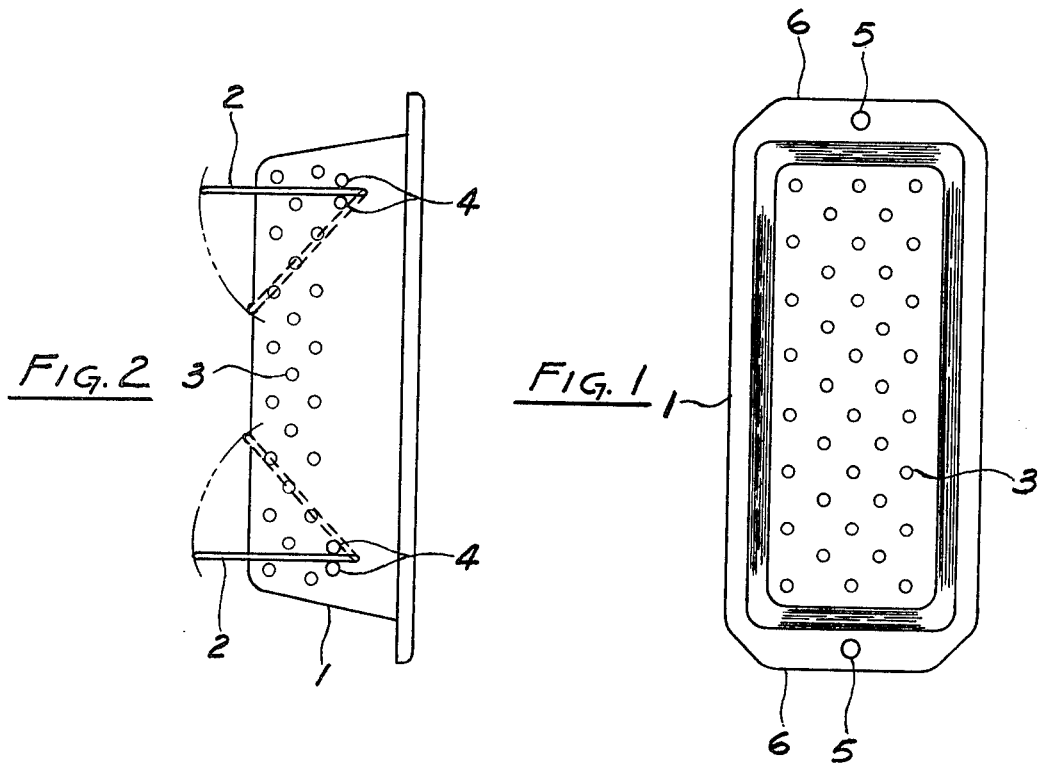
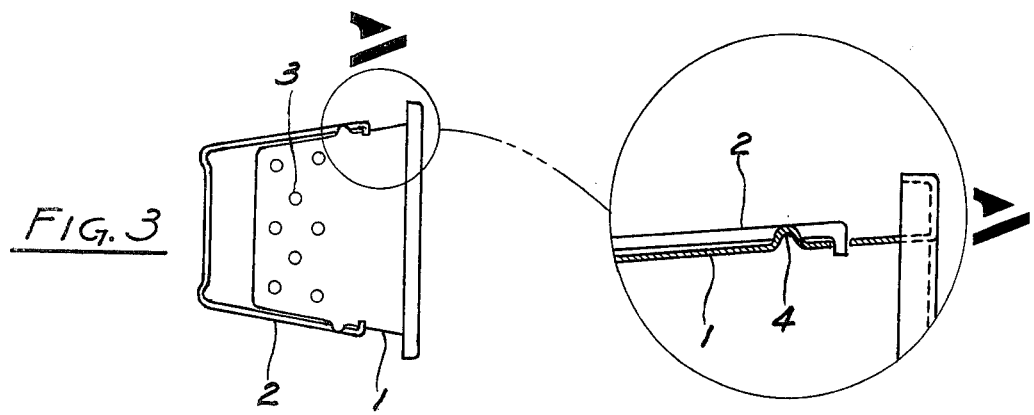

PERFORATED SELF-DRAINING MEATLOAF BAKING PAN

SUMMARY OF INVENTION

The purpose of my invention as illustrated in FIG. 1, FIG. 2 and FIG. 3 of the enclosed drawing is a perforated self-draining meatloaf baking pan with removable leg stands as a part of the perforated self-draining meatloaf baking pan. The leg stands will support the pan above the draining fat and juices when set over any type of a catching pan. This allows the baking of a meatloaf without the necessity of suctioning or draining the excess fat and juices during the baking period.

BRIEF DESCRIPTION OF DRAWING

FIG. 1 illustrates a top view.
FIG. 2 illustrates a side view.
FIG. 3 illustrates an end view.

DESCRIPTION OF THE PREFERRED EMBODIMENT

FIGS. 1-3 shows a perforated self-draining meatloaf baking pan 1 comprising a receptacle including a bottom wall and a peripheral wall. The pan 1 has a thickness of approximately 0.030 and is made of aluminum or copper or stainless steel sheeting of a cold drawn process. Two leg stands 2 of heavy gauge springable type wire of aluminum, copper or stainless steel are pivotally attached to the peripheral wall. The leg stands 2 can be removed for cleaning purposes, replaced and folded for storing as indicated in FIG. 2. Each of the two leg stands 2 are secured in a vertical or extended position between two dimples 4 on each side of the pan.

Drain holes 3 approximately 3/16 inch in diameter are located on all five sides of the perforated self-draining meatloaf baking pan; that is, all four sides of the peripheral wall and the bottom side. This enables total drainage of fat and juices.

Leg stand dimples 4 secure and retain the leg stands 2 in a vertical position. The dimples 4 are pressed out far enough so as not to perforate the metal. Two holes 5, one at each end of the perforated self-draining meatloaf baking pan are provided for the purpose of hanging the pan for storing if so desired. A protruding rim 6 is provided for gripping and handling purposes.

I claim the following:

1. A self-draining baking pan comprising:
   a receptacle for receiving an item to be baked, said receptacle including a bottom wall and a peripheral wall, said peripheral wall being joined to the bottom wall and projecting outwardly therefrom;
   at least one leg stand;
   means for attaching said leg stand to said peripheral wall for pivotal movement, said leg stand being pivotable to an extended position in which it can engage a supporting surface to support said bottom wall above the supporting surface and in spaced relationship to the supporting surface;
   means for releasably retaining the leg stand in the extended position; and
   drain hole means in said bottom wall and in said peripheral wall whereby fat and juices from the item being baked can drain from said receptacle through said drain hole means.

2. A self-draining baking pan as defined in claim 1 wherein said one leg stand is a first leg stand and said pan includes a second leg stand, each of said leg stands being constructed of wire, said pan including means for attaching said second leg stand to said peripheral wall for pivotal movement, said second leg stand being pivotable to an extended position in which it can engage a supporting surface to support the bottom wall above the supporting surface and in spaced relationship to the supporting surface, said drain hole means including a first plurality of openings in said peripheral wall and a second plurality of openings in said bottom wall.

3. A self-draining baking pan as defined in claim 2 wherein said retaining means for said first leg stand includes first and second dimples on said peripheral wall and a portion of said first leg stand lies between said dimples in said extended position whereby said first leg stand is releasably retained in the extended position.

4. A self-draining baking pan as defined in claim 3 wherein said pan is constructed of metal, each of said leg stands is generally of U-shaped configuration with both legs of the U pivotally attached to the peripheral wall and with both legs of the U extending along the peripheral wall for a major portion of the length of said legs of the U at least when the leg stands are in said extended position.

* * * * *